United States Patent
Kawamura

(10) Patent No.: US 12,275,194 B2
(45) Date of Patent: Apr. 15, 2025

(54) METHODS FOR JOINING UNIDIRECTIONAL TAPES

(71) Applicant: Toyota Motor Engineering & Manufacturing North America, Inc., Plano, TX (US)

(72) Inventor: Nobuya Kawamura, Seaside, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 175 days.

(21) Appl. No.: 18/159,298

(22) Filed: Jan. 25, 2023

(65) Prior Publication Data

US 2024/0246302 A1    Jul. 25, 2024

(51) Int. Cl.

| | |
|---|---|
| *B29C 65/00* | (2006.01) |
| *B29C 65/14* | (2006.01) |
| *B29C 65/16* | (2006.01) |
| *B29C 70/20* | (2006.01) |
| *B29C 70/54* | (2006.01) |
| *B65H 21/00* | (2006.01) |
| B29C 65/02 | (2006.01) |
| B29K 105/08 | (2006.01) |

(52) U.S. Cl.
CPC ...... *B29C 66/1142* (2013.01); *B29C 65/1412* (2013.01); *B29C 65/16* (2013.01); *B29C 70/20* (2013.01); *B29C 70/545* (2013.01); *B65H 21/00* (2013.01); *B29C 65/02* (2013.01); *B29C 66/0384* (2013.01); *B29C 66/1224* (2013.01); *B29C 66/12241* (2013.01); *B29C 66/341* (2013.01); *B29C 66/721* (2013.01); *B29C 66/7214* (2013.01); *B29K 2105/0881* (2013.01); *B65H 2301/4606* (2013.01); *B65H 2301/4622* (2013.01); *B65H 2301/4634* (2013.01); *B65H 2301/464* (2013.01)

(58) Field of Classification Search
None
See application file for complete search history.

(56) References Cited

U.S. PATENT DOCUMENTS

| | | |
|---|---|---|
| 7,976,932 B1 | 7/2011 | Lyons et al. |
| 9,366,046 B1 | 6/2016 | Rodrick |
| 9,745,849 B2 | 8/2017 | Hardwicke et al. |
| (Continued) | | |

FOREIGN PATENT DOCUMENTS

| | | |
|---|---|---|
| CN | 105729791 A | 7/2016 |

*Primary Examiner* — Philip C Tucker
*Assistant Examiner* — Nickolas R Harm
(74) *Attorney, Agent, or Firm* — Dinsmore & Shohl LLP

(57) ABSTRACT

A method for joining unidirectional tapes is provided. The method includes placing a plurality of unidirectional tapes by abutting without overlapping an end of one of the unidirectional tapes with an end of other one of the unidirectional tapes at a butt joint. The unidirectional tapes includes a resin material and a plurality of fibers running in a running direction. The method further includes placing a prepreg including a resin material and a plurality of short fibers over the butt joint to cover an area surrounding the butt joint such that the short fibers run in the running direction. The method further includes fusing the prepreg by applying heat such that the short fibers are fused into a matrix of the unidirectional tapes at the butt joint.

9 Claims, 3 Drawing Sheets

(56) References Cited

U.S. PATENT DOCUMENTS

2002/0157785 A1\* 10/2002 Anderson ......... B29C 66/72525
            156/304.6
2021/0370620 A1   12/2021 Kuntz
2022/0161508 A1    5/2022 Kuntz et al.
2023/0219696 A1\*  7/2023 Thompson ................ B32B 3/06
            244/1 A \* cited by examiner

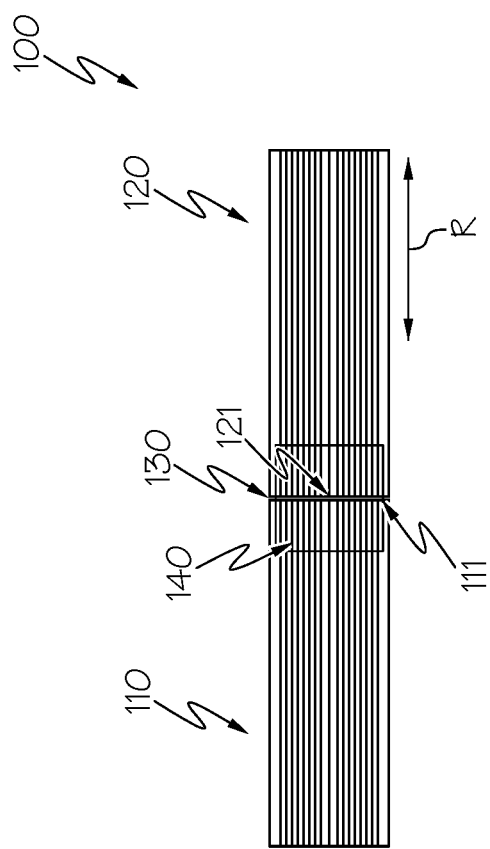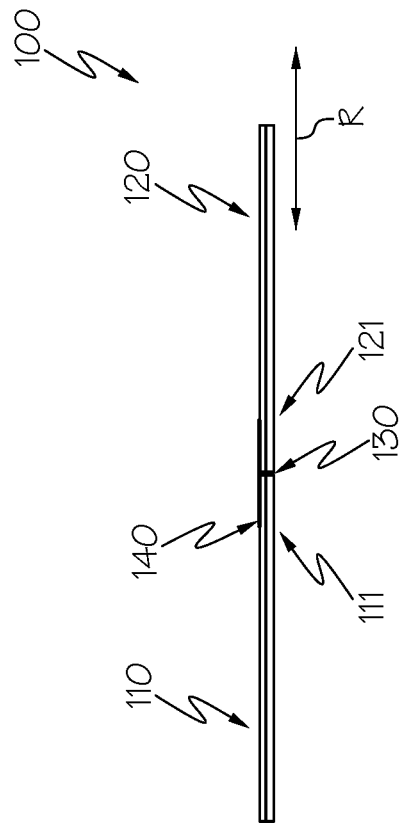
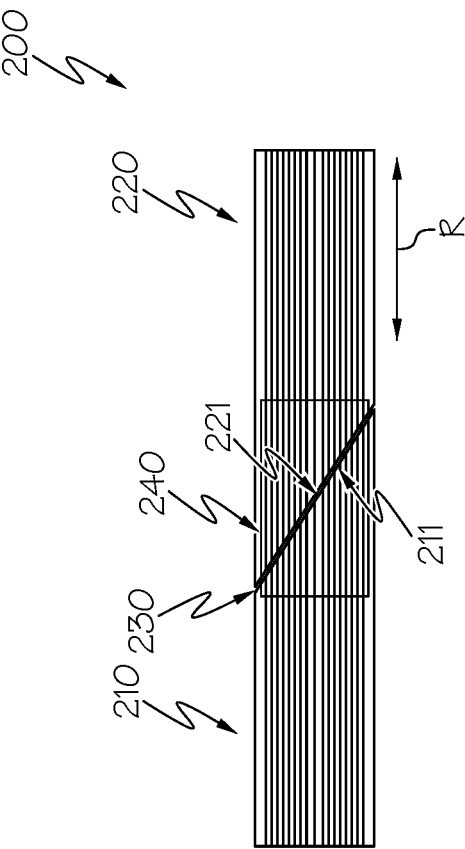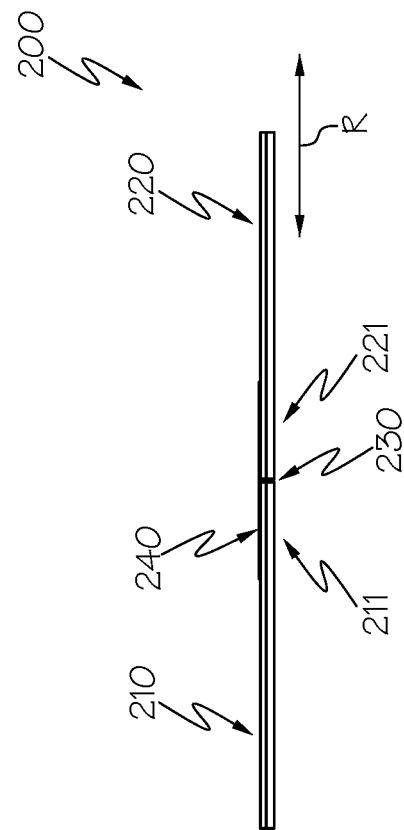

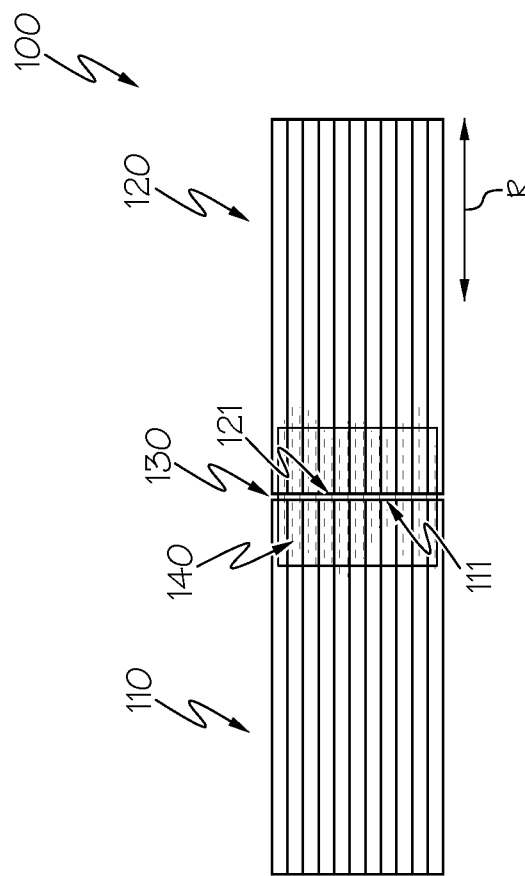
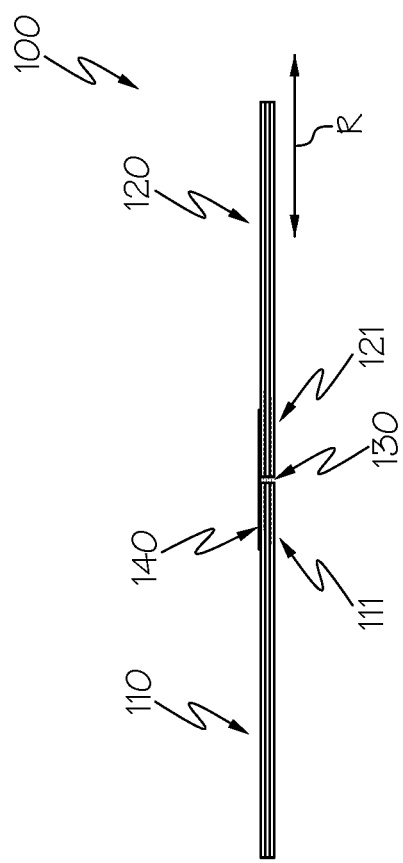
FIG. 3A
FIG. 3B

METHODS FOR JOINING
UNIDIRECTIONAL TAPES

TECHNICAL FIELD

The present specification generally relates to methods for joining unidirectional tapes.

BACKGROUND

Unidirectional tapes are often used in combination with automated fiber placement (AFP) process. The unidirectional tapes may be supplied in spools of several lbs per roll. The unidirectional tapes may be connected by overlapping a certain length at an end and fusing the unidirectional tapes together by heat. This connection is called a splice. When layering the unidirectional tapes having a splice, a location of the splice may become a defect point, especially when the location of the splice is in a close vicinity of a splice of another layer of the unidirectional tapes. The splices in close proximity may cause a thickness of a spliced area where the splices are located to be greater than other areas because the unidirectional tapes are overlapped to each other. Differences in thickness may create a kink and/or buckling in a thickness direction.

SUMMARY

In one embodiment, a method for joining unidirectional tapes is provided. The method includes placing a plurality of unidirectional tapes by abutting without overlapping an end of one of the unidirectional tapes with an end of other one of the unidirectional tapes at a butt joint. The unidirectional tapes includes a resin material and a plurality of fibers running in a running direction. The method further includes placing a prepreg including a resin material and a plurality of short fibers over the butt joint to cover an area surrounding the butt joint such that the short fibers run in the running direction. The method further includes fusing the prepreg by applying heat such that the short fibers are fused into a matrix of the unidirectional tapes at the butt joint.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1A depicts a top view of a splice of unidirectional tapes according to one or more embodiments shown and described herein;

FIG. 1B depicts a side view of the splice of the unidirectional tapes in FIG. 1A according to one or more embodiments shown and described herein;

FIG. 2A depicts a top view of a splice of unidirectional tapes each having a diagonal portion according to one or more embodiments shown and described herein;

FIG. 2B depicts a side view of the splice of the unidirectional tapes in FIG. 2A according to one or more embodiments shown and described herein;

FIG. 3A depicts a top view of the splice of the unidirectional tapes in FIG. 1A joined according to one or more embodiments shown and described herein;

FIG. 3B depicts a side view of the splice of the joined unidirectional tapes in FIG. 3A according to one or more embodiments shown and described herein.

DETAILED DESCRIPTION

Figure 4:
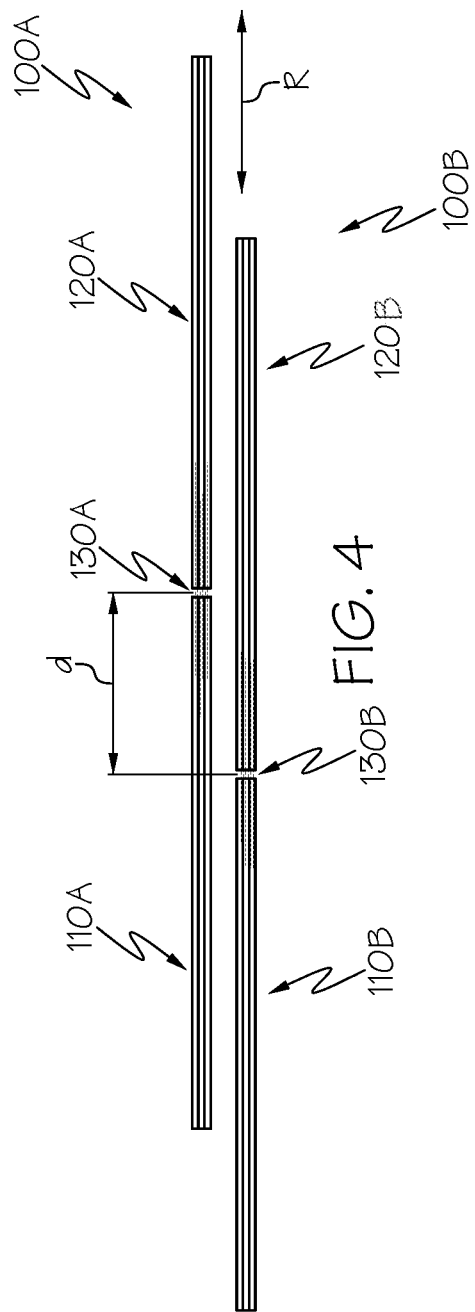
FIG. 4 depicts a side view of a plurality of layers of joined unidirectional tapes according to one or more embodiments shown and described herein.

FIGS. 1A and 1B generally depicts one embodiment of a splice of a plurality of unidirectional tapes. The unidirectional tapes are placed by abutting without overlapping an end of one unidirectional tape and an end of another unidirectional tape at a butt joint. Since there is no overlapping at the butt joint, joined unidirectional tapes may not add thickness. For example, a thickness of the unidirectional tapes may be substantially the same as a thickness of the joined unidirectional tapes at the butt joint. When the splice is layered with another splice, a thickness of the entire layer where the butt joints are in close proximity may be substantially the same as a thickness of other areas away from the butt joints. Therefore, various embodiments describe herein may prevent creation of a kink and/or buckling in the thickness direction. Various embodiments of the methods and the unidirectional tapes will be described in more detail herein.

Referring now to FIGS. 1A and 1B, a splice 100 of a plurality of unidirectional tapes 110, 120 is depicted. The unidirectional tape 110 and the unidirectional tape 120 are placed by abutting without overlapping an end 111 of the unidirectional tape 110 and an end 121 of the unidirectional tape 120 at a butt joint 130.

In embodiments, the end 111 of the unidirectional tape 110 and the end 121 of the unidirectional tape 120 have the same shape. For example, the end 111 and the end 121 may be cut straight in a direction perpendicular to a longitudinal direction of the unidirectional tapes 110, 120. The end 111 may be aligned with the end 121 such that to create no overlaps between the unidirectional tapes 110, 120 at the butt joint 130. In embodiments, the butt joint 130 may have a gap about 0.2 mm or less. The gap may be about 0.1 mm or less. In embodiments, the butt joint 130 does not have a gap. For example, the end 111 and the end 121 may touch at respective edges of the end 111 and the 121 in the longitudinal direction of the unidirectional tapes 110, 120.

The unidirectional tapes 110, 120 include a resin material and a plurality of fibers running in a running direction R (e.g., the longitudinal direction of the unidirectional tapes 110, 120). In embodiments, the resin material of the unidirectional tapes 110, 120 may be any material that is either thermoset or thermoplastics. For example, the resin material of the unidirectional tapes 110, 120 may be epoxy, silicone, polyurethane, polyester, vinyl ester, polyimide, urethane, nylon, phenolic, or the like. Also, for example, the resin material of the unidirectional tapes 110, 120 may be polyetherimide (PEI), polyetheretherketone (PEEK), polyamide-imide (PAI), polycarbonate (PC), or the like. The resin material of the unidirectional tapes 110, 120 may be a combination of any of the thermoset or thermoplastics. Above examples of the resin material are non-limiting.

In embodiments, the fibers of the unidirectional tapes 110, 120 may be carbon fibers, which may be polyacrylonitrile (PAN)-based carbon fibers, for example. The carbon fibers may exhibit a fiber modulus of about 33 to 34 million pounds per square inch (msi) or slightly higher. In embodiments, the fibers of the unidirectional tapes 110, 120 may be glass, Kevlar®, carbon, glass comingled, or the like. The fibers of the unidirectional tapes 110, 120 may be aligned in the running direction R.

In embodiments, a basis weight of the unidirectional tapes 110, 120 may be about 50 to 200 grams per square meter. The basis weight of the unidirectional tapes 110, 120 may be about 100 grams per square meter.

A prepreg 140 is placed over the butt joint 130 to cover an area surrounding the butt joint 130. In embodiments, the prepreg 140 may have a width (e.g., the width in a direction perpendicular to the running direction R) sufficient to cover the area surrounding the butt joint 130. For example, the width of the prepreg 140 may be substantially the same as a width of the unidirectional tapes 110, 120. In embodiments, the prepreg 140 may have a length (e.g., the length in the running direction R) sufficient to cover the area surrounding the butt joint 130. For example, the length of the prepreg 140 may be about ¼ inch. The length may be less than ¼ inch. For example, the length may be about ⅛ inch. In embodiments, the prepreg 140 may have a thickness of about 150 μm or less. The thickness of the prepreg 140 may be about 100 μm or less. The prepreg 140 may be a short fiber clef that includes unidirectionally aligned short fibers and resin powder. The short fiber clef may be heated to melt the resin powder to tack the short fibers together for the handling purpose.

The prepreg 140 includes a resin material and a plurality of fibers running in the running direction R. For example, the prepreg 140 is a fiber prepreg impregnated with a resin matrix. In embodiments, the resin material of the prepreg 140 may be any material that is either thermoset or thermoplastics. For example, the resin material of the prepreg 140 may be epoxy, silicone, polyurethane, polyester, vinyl ester, polyimide, urethane, nylon, phenolic, or the like. Also, for example, the resin material may be polyetherimide (PEI), polyetheretherketone (PEEK), polyamide-imide (PAI), polycarbonate (PC), or the like. The resin material of the prepreg 140 may be a combination of any of the thermoset or thermoplastics. The prepreg 140 may be impregnated above examples of the resin material of the prepreg 140 are non-limiting.

In embodiments, the fibers of the prepreg 140 may be short fibers. The fibers of the prepreg 140 may be carbon fibers, which may be polyacrylonitrile (PAN)-based carbon fibers, for example. The carbon fibers of the prepreg 140 may exhibit a fiber modulus of about 33 to 34 million pounds per square inch (msi) or slightly higher. In embodiments, the fibers of the prepreg 140 may be glass, Kevlar®, carbon, glass comingled, or the like. In embodiments, only the fibers of the prepreg 140 impregnate in between the fibers of the unidirectional tapes 110, 120.

In embodiments, a basis weight of the prepreg 140 may be about 5 to 40 grams per square meter. The basis weight of the prepreg 140 may be about 8 to 10 grams per square meter. In embodiments, a volume ratio of the resin material may be about 50% and a volume ratio of the fiber may be about 50%. The volume ratio of the resin material may be less than the volume ratio of the fiber. For example, the volume ratio of the resin material may be about 40% and the volume ratio of the fiber may be about 60%. The significantly low weight and volume of the prepreg 140 may allow the total weight and volume at the butt joint 130 to be within a deviation range of the unidirectional tapes 110, 120 when the prepreg 140 is impregnated into the unidirectional tapes 110, 120, which may enable to avoid thickness and width increases of the unidirectional tapes 110, 120.

In embodiments, the resin material of the unidirectional tapes 110, 120 may be the same as the resin material of the prepreg 140. In embodiments, the resin material of the unidirectional tapes 110, 120 may be different from the resin material of the prepreg 140. In embodiments, the resin material of the unidirectional tape 110 may be different from the resin material of the unidirectional tape 120.

Referring to FIGS. 2A and 2B, a splice 200 of a plurality of unidirectional tapes 210, 220, according to other embodiments of the splice 100, is depicted. The unidirectional tape 210 and the unidirectional tape 220 are placed by abutting without overlapping an end 211 (e.g., a diagonal end) of the unidirectional tape 210 and an end 221 (e.g., a diagonal end) of the unidirectional tape 220 at a butt joint 230.

In embodiments, the end 211 of the unidirectional tape 210 and the end 221 of the unidirectional tape 220 have the same shape. In embodiments, the end 211 of the unidirectional tape 210 and the end 221 of the unidirectional tape 220 may be cut in a shape including a diagonal portion. For example, the end 211 and the end 221 are cut diagonally with respect to a longitudinal direction of the unidirectional tapes 110, 120. In embodiments, the shape may include a V shape, a W shape, a zigzag shape, or the like. The shape may be symmetrical or asymmetrical.

The end 211 may be aligned with the end 221 such that to create no overlaps between the unidirectional tapes 210, 220 at the butt joint 230. In embodiments, the butt joint 230 may have a gap about 0.2 mm or less. The gap may be about 0.1 mm or less. In embodiments, the butt joint 230 does not have a gap. For example, the end 211 and the end 221 may touch at respective edges of the end 211 and the 221 in the longitudinal direction of the unidirectional tapes 210, 220.

The unidirectional tapes 210, 220 include a resin material and a plurality of fibers running in a running direction R (e.g., the longitudinal direction of the unidirectional tapes 210, 220). Unless noted otherwise, the configurations of the unidirectional tapes 210, 220 including materials are the same as those described in the embodiments of the splice 100, thereby omitted detailed descriptions.

A prepreg 240 is placed over the butt joint 230 to cover an area surrounding the butt joint 230. In embodiments, the prepreg 240 may have a width (e.g., the width in a direction perpendicular to the running direction R) sufficient to cover the area surrounding the butt joint 230. For example, the width of the prepreg 240 may be substantially the same as a width of the unidirectional tapes 210, 220. In embodiments, the prepreg 240 may have a length (e.g., the length in the running direction R) sufficient to cover the area surrounding the butt joint 230. For example, the length of the prepreg 240 may be sufficient to cover an area surrounding the diagonal end 211 of the unidirectional tape 210 and the diagonal end 221 of the unidirectional tape 220. For example, the length of the prepreg 240 may be sufficient to cover a longitudinal length of the diagonal end 211 of the unidirectional tape 210 and the diagonal end 221 of the unidirectional tape 220. In embodiments, the prepreg 240 may have a thickness of about 150 μm or less. The thickness of the prepreg 240 may be about 100 μm or less.

The prepreg 240 includes a resin material and a plurality of fibers running in the running direction R. Unless noted otherwise, the configurations of the prepreg 240 including materials are the same as those described in the embodiments of the prepreg 140, thereby omitted detailed descriptions.

Referring to FIGS. 3A and 3B, the prepreg 140 is fused by heat such that the short fibers of the prepreg 140 are fused into a resin matrix of the unidirectional tapes 110, 120 and the butt joint 130. The same fusing configurations apply to the other embodiments of the splice 200. The heat may be applied by any heating method such as, for non-limiting examples, laser heating, infrared heating (e.g., infrared radiation (IR) heating), or the like. In embodiments, pressure is applied to the prepreg 140 when applying the heat to fuse the prepreg 140. The heat and the pressure may be applied at the same time. A fast process may be needed to apply the heat and the pressure to the prepreg 140 to join the unidirectional tapes 110, 120, so that the feed of the unidirectional tapes 110, 120 is not abrupted when changing quills for the unidirectional tapes 110, 120 on an AFP machine.

In embodiments, the short fibers of the prepreg 140 may be fused into the matrix of the unidirectional tapes 110, 120 at the butt joint 130 such that a thickness of the joined unidirectional tapes is not greater than a thickness of the unidirectional tapes 110, 120. In embodiments, the thickness of the joined unidirectional tapes may be substantially the same as the thickness of the unidirectional tapes 110, 120. During fusing, the short fibers of the prepreg 140 may be moved to be positioned between the fibers of the unidirectional tapes 110, 120. The resin of the prepreg 140 may be spread over the area surrounding the butt joint 130. The short fibers of the prepreg 140 may be aligned in the running direction R. Therefore, the short fibers of the prepreg 140 and the fibers of the unidirectional tapes 110, 120 may be aligned in the same direction (e.g., the running direction R).

Referring to FIG. 4, joined unidirectional tapes 100A may be layered with another joined unidirectional tapes 100B such that a butt joint 130A of the joined unidirectional tapes 100A and a butt joint 130B of the joined unidirectional tapes 100B are staggered to each other. In embodiments, the butt joint 130A and the butt joint 130B may be staggered at a distance d from each other. For example, the butt joint 130A and the butt joint 130B may be staggered at least 20 mm apart from each other. In embodiments, the butt joint 130A and the butt joint 130B may be staggered at least the width of the prepreg used to fuse to manufacture the joined unidirectional tapes 100A or the joined unidirectional tapes 100B.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for joining unidirectional tapes comprising:
   placing a plurality of unidirectional tapes by abutting without overlapping an end of one of the unidirectional tapes with an end of an other one of the unidirectional tapes at a butt joint, the unidirectional tapes including a resin material and a plurality of fibers running in a running direction;
   placing a prepreg including a resin material and a plurality of fibers over the butt joint to cover an area surrounding the butt joint such that the fibers run in the running direction; and
   fusing the prepreg by applying heat such that the fibers are fused into a matrix of the unidirectional tapes at the butt joint.

2. The method of claim 1, further comprising:
   applying pressure to the prepreg when applying the heat to fuse the prepreg.

3. The method of claim 1, wherein the fibers are fused into the matrix of the unidirectional tapes at the butt joint such that a thickness of the joined unidirectional tapes is not greater than a thickness of the unidirectional tapes.

4. The method of claim 1, further comprising:
   cutting the end of the one of the unidirectional tapes and the end of the other of the unidirectional tapes in a shape including a diagonal portion.

5. The method of claim 1, further comprising:
   aligning the end of the one of the unidirectional tapes and the end of the other one of the unidirectional tapes.

6. The method of claim 1, further comprising:
   layering the joined unidirectional tapes with another joined unidirectional tapes such that the butt joint of the joined unidirectional tapes and a butt joint of the another joined unidirectional tapes are staggered relative to each other.

7. The method of claim 6, wherein layering the joined unidirectional tapes includes staggering the butt joint of the joined unidirectional tapes and the butt joint of the another joined unidirectional tapes at least 20 mm apart from each other.

8. The method of claim 1, wherein the resin material of the prepreg is the same as the resin material of the unidirectional tapes.

9. The method of claim 1, wherein a basis weight of the unidirectional tapes is 50 to 200 grams per square meter and a basis weight of the prepreg is 5 to 40 grams per square meter.

* * * * *